United States Patent
Reinpoldt et al.

(10) Patent No.: US 12,087,142 B2
(45) Date of Patent: *Sep. 10, 2024

(54) METHOD AND SYSTEM FOR DETECTING CONCEALED OBJECTS USING HANDHELD THERMAL IMAGER

(71) Applicant: THERMAL MATRIX USA, INC., Tampa, FL (US)

(72) Inventors: Michael A. Reinpoldt, Windermere, FL (US); Willem H. Reinpoldt, III, Tarpon Springs, FL (US); Richard J. Salem, Tampa, FL (US)

(73) Assignee: THERMAL MATRIX USA, INC., Tampa, FL (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/199,652

(22) Filed: Mar. 12, 2021

(65) Prior Publication Data
US 2021/0201074 A1  Jul. 1, 2021

Related U.S. Application Data

(63) Continuation-in-part of application No. 15/952,993, filed on Apr. 13, 2018, now Pat. No. 10,949,677, (Continued)

(51) Int. Cl.
*G08B 13/19* (2006.01)
*G06F 18/211* (2023.01)
(Continued)

(52) U.S. Cl.
CPC ............ *G08B 13/19* (2013.01); *G06F 18/211* (2023.01); *G06F 18/24* (2023.01); *G06T 7/20* (2013.01);
(Continued)

(58) Field of Classification Search
None
See application file for complete search history.

(56) References Cited

U.S. PATENT DOCUMENTS

| 5,275,364 A | 1/1994 | Burger et al. |
| 5,364,795 A | 11/1994 | Sausa et al. |

(Continued)

FOREIGN PATENT DOCUMENTS

DE  102009040017 A  * 3/2011  ............ G01J 5/0025

OTHER PUBLICATIONS

Pratt, W.K., "Histogram Modification" in Digital Image Processing, ISBN0-471-01888-0, pp. 311-318, 1978.

*Primary Examiner* — Mohammed Jebari
(74) *Attorney, Agent, or Firm* — ALLEN, DYER ET AL.

(57) ABSTRACT

A method of detecting concealed objects using a thermal imager includes obtaining an output comprising a plurality of pixels representing a person, analyzing each pixel matching a contour of the person and excluding any pixel within a blob bounding box of the person, and determining whether a pixel address is represented in a pixel map. In addition, the method includes comparing a value of each remaining pixel to an allowable minimum threshold value representing a lower pre-defined body temperature, and comparing the value of each remaining pixel greater than or equal to the allowable minimum threshold value to an upper allowable threshold value representing an upper pre-defined body temperature. The method also includes excluding any of the remaining pixels within a range between the lower and upper pre-defined body temperatures to define final set of pixels and calculating a pixel difference to indicate a severity of the difference.

13 Claims, 11 Drawing Sheets

Related U.S. Application Data which is a continuation-in-part of application No. 13/074,305, filed on Mar. 29, 2011, now abandoned.

(51) Int. Cl.

| | | |
|---|---|---|
| *G06F 18/24* | (2023.01) | |
| *G06T 7/20* | (2017.01) | |
| *G06T 7/70* | (2017.01) | |
| *G06V 10/143* | (2022.01) | |
| *G06V 10/25* | (2022.01) | |
| *G06V 10/40* | (2022.01) | |
| *G06V 10/44* | (2022.01) | |
| *G06V 10/62* | (2022.01) | |
| *G06V 10/75* | (2022.01) | |
| *G06V 20/52* | (2022.01) | |
| *G06V 30/142* | (2022.01) | |
| *G06V 40/10* | (2022.01) | |
| *G08B 21/18* | (2006.01) | |
| *H04N 5/33* | (2023.01) | |

(52) U.S. Cl.
CPC .............. *G06T 7/70* (2017.01); *G06V 10/143* (2022.01); *G06V 10/25* (2022.01); *G06V 10/40* (2022.01); *G06V 10/44* (2022.01); *G06V 10/62* (2022.01); *G06V 10/752* (2022.01); *G06V 20/52* (2022.01); *G06V 30/142* (2022.01); *G06V 40/10* (2022.01); *G06V 40/103* (2022.01); *G08B 21/182* (2013.01); *H04N 5/33* (2013.01); *G06T 2207/10048* (2013.01); *G06T 2207/30196* (2013.01); *G06V 2201/05* (2022.01)

(56) References Cited

U.S. PATENT DOCUMENTS

| | | |
|---|---|---|
| 6,606,115 B1 * | 8/2003 | Alicandro et al. .... G01J 5/0066 |
| | | 348/164 |
| 6,900,729 B2 | 5/2005 | Paximadis et al. |
| 7,304,297 B1 | 12/2007 | King et al. |
| 7,498,576 B2 | 3/2009 | Micko |
| 2003/0163042 A1 | 8/2003 | Salmon |
| 2004/0140430 A1 | 7/2004 | Micko |
| 2004/0165154 A1 | 8/2004 | Kobori et al. |
| 2004/0174289 A1 | 9/2004 | Singh et al. |
| 2006/0242186 A1 | 10/2006 | Hurley |
| 2007/0058037 A1 | 3/2007 | Bergeron et al. |
| 2007/0075246 A1 | 4/2007 | Gatt |
| 2007/0118324 A1 | 5/2007 | Gulati |
| 2008/0144885 A1 | 6/2008 | Zucherman et al. |
| 2008/0191925 A1 | 8/2008 | Martin et al. |
| 2008/0240578 A1 | 10/2008 | Gudmundson et al. |
| 2008/0298640 A1 | 12/2008 | Reinpoldt, III |
| 2009/0041292 A1 | 2/2009 | Daly et al. |
| 2009/0041293 A1 | 2/2009 | Andrew et al. |
| 2009/0060272 A1 | 3/2009 | Reinpoldt, III |
| 2009/0110232 A1 | 4/2009 | Khodor et al. |
| 2009/0297039 A1 | 12/2009 | Reinpoldt, III et al. |
| 2010/0104193 A1 | 4/2010 | Takeda et al. |
| 2010/0165111 A1 | 7/2010 | Gorian et al. |
| 2014/0028457 A1 | 1/2014 | Reinpoldt et al. |

* cited by examiner

```
// concealed object detection: method 1
// sum pixels outlying an acceptable range of gray scale pixel
// values exceeds a threshold
bool objectDetected = false;
int outlierCount = 0;
for (int y = 0; y < imageHeight; y++)
    for (int x = 0; x < imageHeight; x++)
    {
        int pixelValue = buffer[y, x];
        if ((pixelValue < minGray) || (pixelValue > maxGray))
            outlierCount++;
    }
if (outlierCount > alarmThreshold)
    objectDetected = true;
```
810

```
// concealed object detection: method 2
// sum gray values outlying an acceptable range of gray scale pixel
// values exceeds a threshold
bool objectDetected = false;
int outlierSum = 0;
for (int y = 0; y < imageHeight; y++)
    for (int x = 0; x < imageHeight; x++)
    {
        int pixelValue = buffer[y, x];
        if (pixelValue < minGray)
            outlierSum += minGray - pixelValue;
        else if (pixelValue > maxGray)
            outlierSum += pixelValue - maxGray;
    }
if (outlierSum > alarmThreshold)
    objectDetected = true;
```
820

```
// concealed object detection: method 3
// sum pixels outlying an acceptable range of gradient values
// exceeds a threshold
bool objectDetected = false;
int gradientCount = 0;
for (int y = 0; y < imageHeight - 1; y++)
    for (int x = 0; x < imageHeight - 1; x++)
    {
        if (Math.Abs(buffer[y, x] - buffer[y, x + 1]) > maxGradient)
            gradientCount++;
        else if (Math.Abs(buffer[y, x] - buffer[y + 1, x]) > maxGradient)
            gradientCount++;
    }
if (gradientCount > alarmThreshold)
    objectDetected = true;
```
830

FIG. 8

METHOD AND SYSTEM FOR DETECTING CONCEALED OBJECTS USING HANDHELD THERMAL IMAGER

RELATED APPLICATIONS

This application is a continuation in part of U.S. application Ser. No. 15/952,993 filed Apr. 13, 2018, now U.S. Pat. No. 10,949,677 which is a continuation in part of U.S. application Ser. No. 13/074,305 filed Mar. 29, 2011 and is hereby incorporated herein in its entirety by reference.

FIELD

The present invention relates in general to the field of security systems, and in particular to a method and system for detecting concealed objects using a thermal imager.

BACKGROUND

A wide variety of security systems are employed for consumer, commercial, industrial, government and military use cases. Security systems can utilize a variety of technologies, including mechanical, electrical, electromechanical, optical, laser and other techniques. Optical security systems are particularly adept at long stand-off surveillance where the sensor and operator can be located a safe distance away from threats. Typical optical security systems may include visible, infrared, millimeter wave, terahertz and x-ray imaging. These systems image different frequencies of energy in the electromagnetic spectrum.

Infrared, millimeter wave, terahertz and x-ray based security systems have the benefit of being able to image concealed objects under the clothing of subjects by imaging the contrast difference between the human body and the concealed object that may attenuate the imagery of the body's natural energy. For example, the human body emits, absorbs and reflects thermal, millimeter wave and terahertz energy in a sensor-observable fashion. In contrast, concealed objects such as explosives, weapons, contraband and the like block, absorb, reflect or otherwise attenuate the body's energy providing the imaging system with a contrasting image, either appearing darker or lighter than the body.

This capability is ideal for imaging suicide bombers, smugglers, and concealed objects such as firearms, contraband, currency, liquids and gels, and the like. One disadvantage of these optical systems and security systems in general, is they are typically not easily portable or rapidly deployable. Prior art concealed object imaging and detection systems are large, heavy and difficult to transport, are not one-man portable, and are thus time consuming and costly to deploy, and expensive and burdensome to transport. Furthermore, prior art concealed object imaging and detection systems are typically engineered for a particular environment, location or use case, making these systems costly in terms of application-specific engineering, training and support. These systems typically require support infrastructure such as electrical power, climate control, inspection areas/lanes, backdrops and the like, thereby limiting or eliminating their "ad hoc" or "on demand" responsiveness and capabilities.

Therefore, a need exists in the art for a light weight, one man portable concealed object detection system that can be easily, perhaps manually, transported to a deployment area and which requires a minimum of installation/support tools, manuals, system components, and traveling/storage containers.

Another need exists in the art for a security method and system for concealed object detection that is rapidly deployable by a minimum of personnel and supports quick setup with little to no field adjustments, testing or ground support. This place-and-go setup methodology greatly reduces the time required to deploy the system and the expense of installers, operators and support personnel.

Another need exists in the art for a concealed object detection security method and system that is flexible enough to be employed in a wide variety of use cases, locations and environments without additional engineering, site preparation, operator training or unit modifications. For example, a need exists for a method and system that is quickly deployable for indoor or outdoor conditions, daytime or nighttime conditions, humid or arid conditions, and the like. Those features are a large advantage over prior art systems that are required to be custom tailored for a particular deployment location or use case, by reducing or eliminating the costs involved in engineering and personnel training for each specific deployment.

Yet another need exists in the art for a security method and system for concealed object detection that is independently powered and can perform in deployments without external infrastructure such as power, utilities, air conditioning, or prior site preparation, thus reducing installation expense and time and presenting a common product and deployment methodology.

Another need exists in the art for a rapid deployment concealed object detection method and system that allows for cost savings due to the economies of scale in manufacturing, engineering and procurement that are realizable due to a flexible and generalized design.

However, in view of the prior art at the time the present invention was made, it was not obvious to those of ordinary skill in the pertinent art how the identified needs could be fulfilled.

SUMMARY

In a particular embodiment, a method of detecting concealed objects using a thermal imager is disclosed. The method includes obtaining an output comprising a plurality of pixels representing a person, analyzing each pixel matching a contour of the person and excluding any pixel within a blob bounding box of the person, and determining whether a pixel address is represented in a pixel map, and excluding pixels representing non-motion, skin, and locations outside of the contour of the person. In addition, the method includes comparing a value of each remaining pixel to an allowable minimum threshold value representing a lower pre-defined body temperature, and comparing the value of each remaining pixel greater than or equal to the allowable minimum threshold value to an upper allowable threshold value representing an upper pre-defined body temperature. The method also includes excluding any of the remaining pixels within a range between the lower and upper pre-defined body temperatures to define the final set of pixels, and calculating a pixel difference between the value of each pixel of the final set of pixels and a respective closest pixel within the range between the lower and upper pre-defined body temperatures to indicate a severity of the difference.

In another particular embodiment, a system to detect a concealed object using a thermal imager is disclosed. The system includes a processor, a memory coupled to the processor, a plurality of sensors coupled to the memory, and an image processing module of the memory configured to process image acquisition, process target tracking, process target orientation detection, and process automated detection and analysis of concealed objects. The image processing module includes an image equalization module configured to enable the image to be digitally modified so that pixel temperature values approximate to a high degree of value of a prior image to provide image data stability. In addition, the imaging processing module includes a concealed object detection module having an algorithm configured to compare pixels within an infrared image to minimum and maximum threshold values which are adjusted by an operator to define a range of expected normal body temperatures, as shown by the equation: if (pixel<min threshold) or (pixel>max threshold) pixel=alarmed. The method also includes an alarm generation module configured to evaluate pixels with temperature deviations detected by the concealed object detection module in order to activate an alarm mechanism.

In another particular embodiment, a system to detect concealed objects using a thermal imager includes a processor having a memory, and an infrared sensor coupled to the processor. The processor is configured to obtain an output comprising a plurality of pixels, analyze each pixel matching a contour of a person and excluding any pixel within a blob bounding box of the person, determine whether a pixel address is represented in a pixel map, but exclude pixels representing non-motion, skin, and locations outside of the contour of the person. The processor also is configured to compare a value of each remaining pixel to an allowable minimum threshold value representing a lower pre-defined body temperature, compare the value of each remaining pixel greater than or equal to the allowable minimum threshold value to an upper allowable threshold value representing an upper pre-defined body temperature, exclude any of the remaining pixels within a range between the lower and upper pre-defined body temperatures to define final set of pixels, and calculate a pixel difference between the value of each pixel of the final set of pixels and a respective closest pixel within the range between the lower and upper pre-defined body temperatures to indicate a severity of the difference.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 8 illustrates pseudo-code algorithms for concealed threat detection;

DETAILED DESCRIPTION

Figure 1:
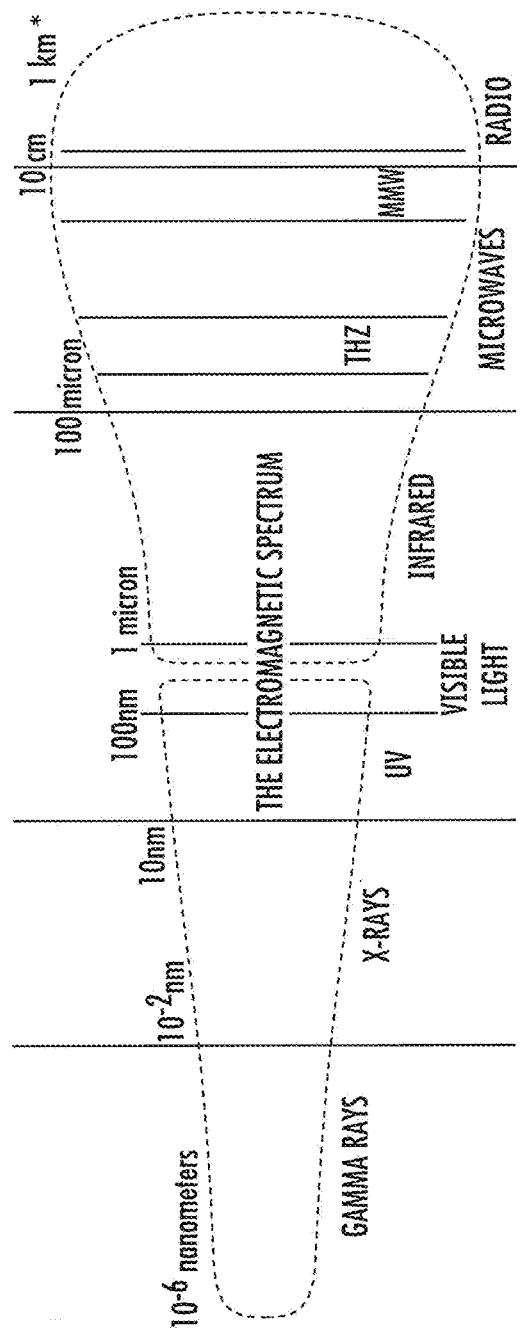
FIG. 1 is a representative image of the electromagnetic spectrum.

The disclosed method and system includes a thermal imager to capture sensor data within the electromagnetic spectrum as shown in FIG. 1. The method and system also includes quickly assembled components that are one man portable, rapidly deployable, and self-contained to process the sensor data. The components are quickly field-replaceable should one or more components become damaged or fail during transportation, storage or use.

The method and system provides a highly portable, "on demand" deployment design and construction with installation and setup time measured in minutes. For example, the system may be self-powered, or powered via on-site power, utilities or resources. Self-powered operation may be accomplished through the use of individual batteries on each system component requiring electrical power, or via a central power source such as battery, uninterruptable power supply, generator or solar blanket, or any combination thereof. Therefore, the self-powered system eliminates the reliance on external resources, utilities or infrastructure, reducing site preparation, infrastructure requirements, cost, and deployment effort.

The method and system can be operated as an entry screening device securing an area or zone from external objects carried-in concealed by subjects, as an exit screening device providing loss prevention of objects carried-out concealed by subjects, or any combination thereof. In addition, the system can be operated overtly, allowing the system's visible appearance and physical presence to serve as a deterrent, or operated covertly by virtue of the system's ability to be rapidly deployed with little or no adjustments, testing, or infrastructure, and the covert and stand-off nature of its imaging technologies.

The method and system can optionally include a computing element (e.g., processor) housed either in the display unit, the handheld thermal imager, or some other location so that the computing element can perform aided or automatic concealed object detection or image filtering and/or enhancement by virtue of image processing algorithms applied to the thermal imagery. In a particular embodiment, the method and system includes a handheld infrared thermal imager camera.

In addition, the method and system can be additionally utilized as an optical target tracker and/or target designator to ancillary equipment such as a laser molecular trace detection sampler, indicating which individuals or items should be sampled and the preferred location for sampling on the individual or item.

Figure 2:
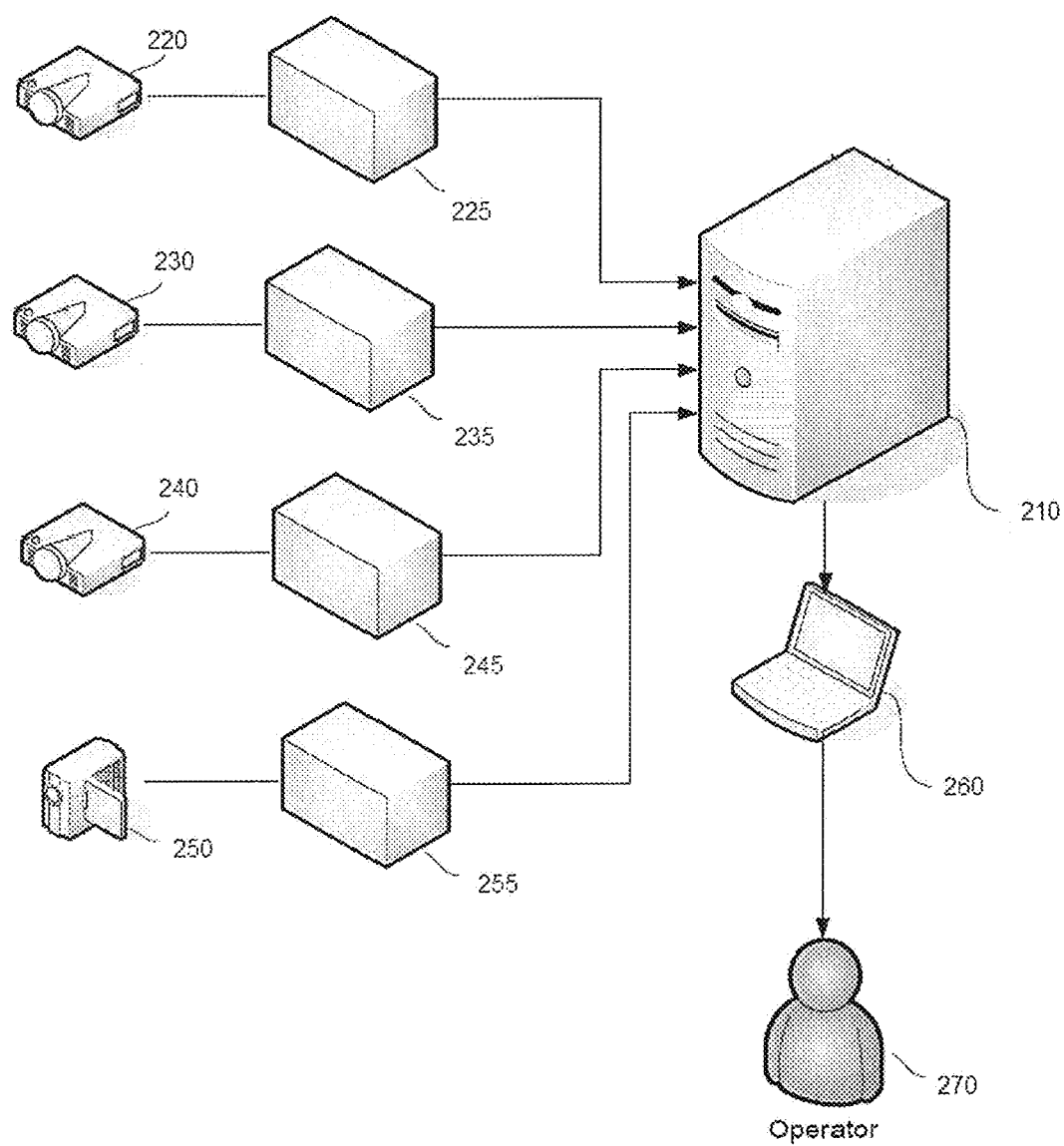
FIG. 2 is a block diagram of a particular embodiment of the hardware components for the inventive system.

Referring now to FIG. 2, in a particular illustrative embodiment the threat detection system 200 includes one or more sensors. In particular, the threat detection system 200 includes a long wave infrared sensor 220, a mid-wave infrared sensor 230, short wave infrared sensor 240, and a visible spectrum camera 250 (i.e. CCTV) communicatively coupled to a processing unit 210 via signal converters 225, 235, 245 and 255, respectively. The signal converters 225, 235, 245 and 255 convert the signals from the sensors 220, 230, 240 and 250, respectively, into digital form for processing unit 210.

If a particular sensor outputs analog video signals such as RS-170, its respective signal converter would take the form of an analog to video converter (ADC) image capture device. If a particular sensor outputs Ethernet digital video signals such as Gig-E, its respective signal converter would take the form of an Ethernet router and/or channel. Other sensor output formats will require corresponding signal converters.

Signal converters 225, 235, 245, 255 may be external to processing unit 210 or internal to processing unit 210. Additionally, some or all signal converters may be embodied in a single device such as an Ethernet switch or router, multi-channel video capture card or multi-channel video server.

The processing unit 210 is coupled to a display device 260, either using a wired or wireless data connection or both, allowing the operator 270 to view the infrared and visible wavelength images as well as the results of the computer analysis possibly including concealed object indication.

This embodiment represents an illustrative configuration. For example, the system 200 can be concealed for covert observation and detection in target areas. In contrast, it can be openly displayed as a deterrent, while being used for overt observation and threat detection.

In a particular embodiment the system 200 utilizes one or more infrared sensors (220, 230, 240) operating in the 3-5 μm band, the 8-12 μm band, or other bands or both. The infrared sensors (220, 230, 240) may be included into the system 200 as a pre-assembled component acquired from an infrared sensor manufacturer. The selected sensor is chosen such that its output is updated in real time and formatted using an x-y matrix of image pixels, providing maximal compatibility with the threat detection software. Typically, the magnitude of the infrared radiation imaged by each pixel within the x-y image matrix is resolved to a value of 0 to 255, where 0 represents a minimal or no infrared reading for that pixel and 255 represents a maximal or full reading for that pixel.

The infrared sensors (220, 230, 240) detect temperature and temperature differential on the clothing surface.

In a particular embodiment, the sensor data received from the infrared sensors (220, 230, 240) is resolved into an x-y image matrix for each sensor, where each image matrix includes pixel values typically ranging in value from 0 to 255, where 0 represents a minimal or no sensor reading for that pixel and 255 represents a maximal or full sensor reading for that pixel. The pixel values then represent the measure of emitted and/or reflected energy in the scene as viewed by each sensor. In the case of viewing a person with an object concealed underneath their clothing, the pixel values may indicate the contrast difference between one or more pixels viewing portions of the person where no concealed object exists and portions of the person where a concealed object exists.

Figure 3:
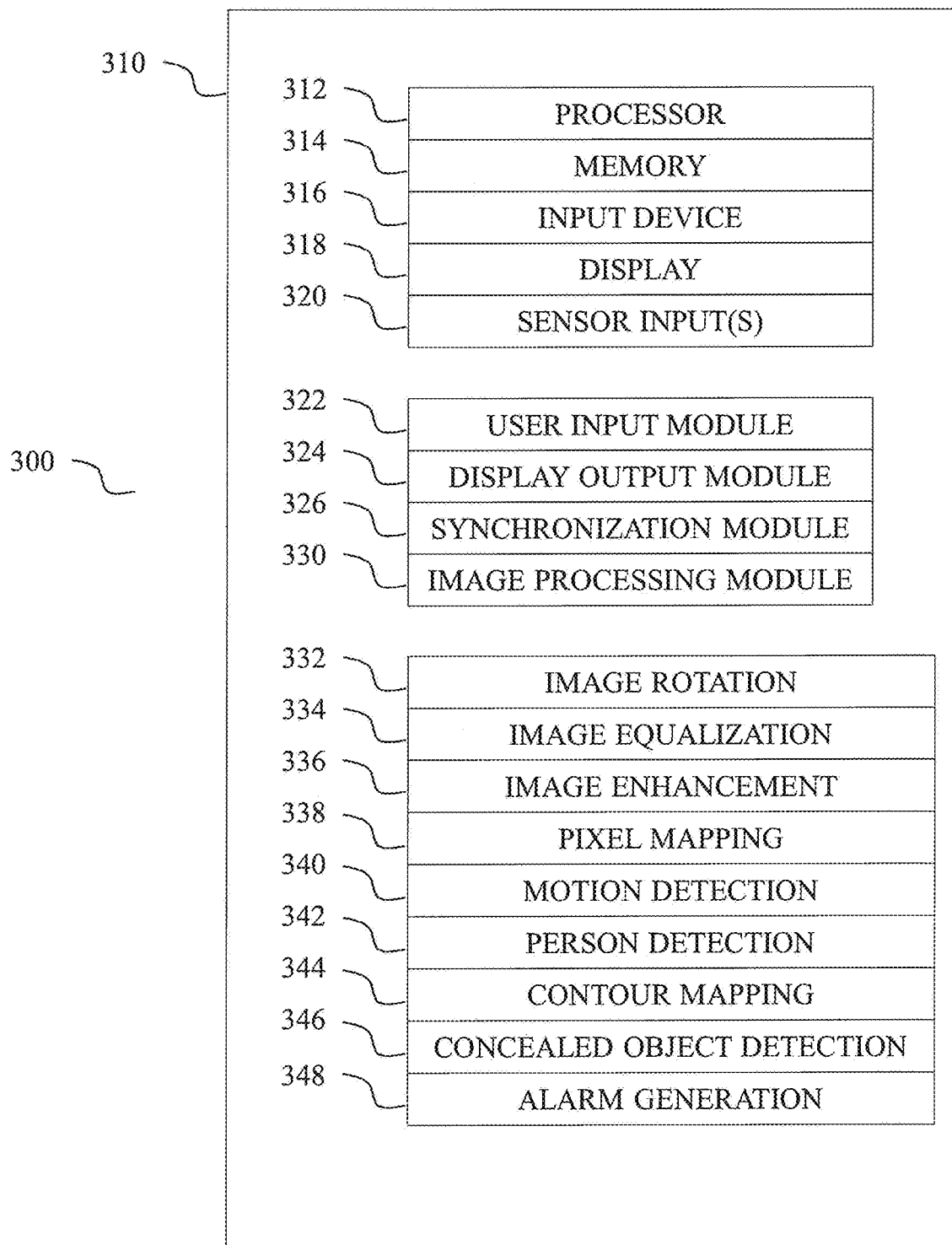
FIG. 3 is a block diagram of a particular embodiment of the computing element for the inventive system.

Referring now to FIG. 3, a block diagram of a particular embodiment of the system is disclosed and generally designated 300. The system 300 includes a computing device 310 that has at least one processor 312 and a memory 314 that is accessible to the processor 312. The memory 314 includes media that is readable by the processor 312 and that stores data and program instructions of software modules that are executable by the processor 312.

The computing device 310 also includes at least one means of user input 316, either keyboard, mouse, light pen, track ball, track pad, joystick, graphics tablet, touch screen, or other GUI input device or any combination thereof that is accessible to the processor 312.

In addition, the computing device 310 has at least one means of user display 318, either a cathode ray tube (CRT) display, liquid crystal display (LCD), light emitting diode (LED) display, plasma display, or other GUI display device that is accessible to the processor 312.

The computing device 310 also includes a plurality of sensor inputs 320, either frame capture hardware, Ethernet video data transmission, or other sensor input means that is accessible to the processor 312.

The processor 312 is configured to execute software instructions residing in memory 314 which monitors, processes and reacts to user input from the input device 316 using a user input module 322, displays operator output and GUI elements to the output device 318 via display formatting and output module 324, synchronizes the video reception, analysis and display using a synchronization module 326, and processing the image acquisition, target tracking, target orientation detection, and automated detection and analysis of concealed objects using an image processing module 330.

The image processing module 330 includes one or more algorithmic feature processing modules including, but not limited to, image rotation module 332, image equalization module 334, image enhancement module 336, pixel mapping module 338, motion detection module 340, person detection module 342, contour mapping module 344, concealed object detection module 346, and alarm generation module 348.

The image rotation module 332 is configured to allow use of imagers rotated at 90 or 270 degrees to provide a portrait vs. landscape orientated image. This is often advantageous when imaging single persons per field of view since a standing person is taller than wider and a portrait orientated imager provides better image coverage with more pixels on target than can be afforded by a landscape oriented view.

The image equalization module 334 is configured to allow the image to be digitally modified so that the pixel temperature values (or pixel light levels when used with the visible color imager) approximate to a high degree the values of the prior image, providing image data stability. This computationally-achieved image data stability then provides a means of further analyzing the image for concealed objects, motion, the presence of people in the scene and other visual attributes. The image equalization module 334 can be implemented in a variety of ways, the simplest of which is a learn mode which learns the value of one or more certain locations within the scene and then adds or subtracts a difference value so that the current scene's pixels equal those one or more locations in value.

The image enhancement module 336 provides algorithms designed to enhance the raw video input from the sensors such as brightness and contrast adjustment, video smoothing via 3×3 averaging convolution matrices, video smoothing via 3×3 median algorithms or other standard image processing algorithms as can be appreciated by those of ordinary skill in the art.

The pixel mapping module 338 provides an algorithmic mechanism to flag individual pixels for future processing or not. For example, pixels in the image where motion has been detected versus the last video frame are candidates for further analysis whereas pixels that have not experienced motion may be withdrawn from consideration. Additionally, pixels that have been previously indicated as background areas via a region-mask designation can be removed from consideration during subsequent image processing.

The motion detection module 340 is configured to detect movement or motion within the current image versus either the previous image (s) or a designated/learned image, or both. The absence of motion within an image may be a cause for blanking the display whereas the presence of motion may be a cause for waking a display and activating further processing.

The person detection module 342 is configured to detect the presence of people in the image allowing for subsequent tracking and detection of person-borne concealed objects using concealed object detection module 346. In the absence of person detection (e.g., person detection module 342 is turned off), full-frame analysis can be performed. One example of full frame analysis without person detection module 342 enabled would be concealed object detection via concealed object detection module 346 which would reveal the temperature differences versus the selected minimum and maximum thresholds for not only areas on a subject's person, but also image-wide, causing possible extraneous indications in background areas of the image. Person detection can be implemented using a variety of algorithms either custom or in the public domain, including but not limited to face detection and/or recognition, motion detection, and body-range heat detection algorithms.

The contour mapping module 344 is configured to allow for more authoritative person detection and body mapping using algorithms to ignore areas on or around the person such as between the legs and between the arms and torso.

The concealed object detection module 346 is configured to algorithmically detect certain objects concealed under clothing by virtue of the possible temperature differential between the concealed object and the body's natural heat emanations. In a particular embodiment, this algorithm would compare pixels within the infrared image to minimum and maximum threshold values which are adjusted by the operator to define the range of expected normal body temperatures, as shown in Equation 1 below. Pixels representing objects that are either colder or hotter than the normally expected threshold values are then suspect and considered for alarming by the alarm generation module 348. For this simplified algorithm to be most effective, the image equalization module 334 must be proficient at modifying the raw image received by the cameras to an expected range of values commensurate with the operator selected threshold values.

$$\text{if (pixel<min threshold) or (pixel>max threshold)} \\ \text{pixel=alarmed} \qquad (1)$$

The alarm generation module 348 is configured to algorithmically evaluate the pixels with suspect temperature deviations detected by the concealed object detection module 346 and to activate an alarm mechanism if sufficient disturbed pixels exist in the proscribed configuration. The alarm mechanism may include but not be limited to, audible tone, visual indicator, on-screen alarm highlights, activation of mag-lock doors, or activation of a video recording device. The proscribed configuration of disturbed pixels can include but not be limited to raw disturbed pixel count versus a threshold setting, grouping of disturbed pixels, shape of disturbed pixels, or distribution of disturbed pixels. For advanced grouping determination, the system may leverage a blob detection algorithm as can be appreciated by those of ordinary skill in the art as well as Hough Transforms and the like to analyze the characteristics of the disturbed pixels for possible object recognition.

The modules described above may be implemented in hardware, firmware, software, other programmable logic, or any combination thereof.

Figure 4:
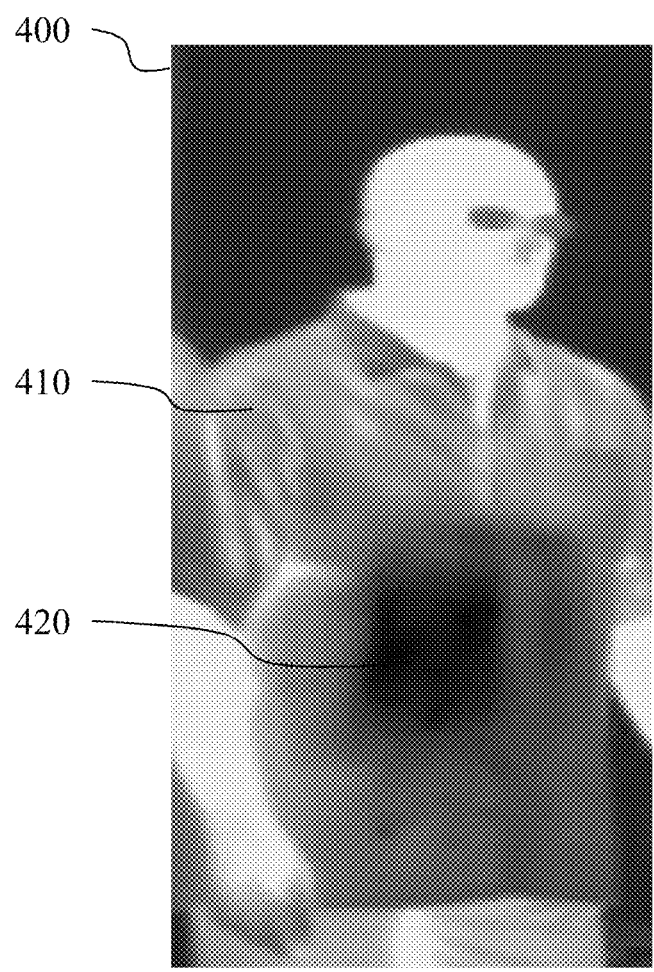
FIG. 4 is an image of an illustrative display from an infrared sensor, showing a person with contrasting threat object concealed under his clothing.

Referring now to FIG. 4, the signal received from one of the plurality of sensors (220, 230, 240) is resolved into an x-y image matrix storing the information as pixel values. The x-y image matrix can then be displayed as pixel data on a display device 400 allowing visualization of the data. Pixels representing non-occluded areas 410 (no concealed object) are indicated with pixel values towards the mid to light range of the gray scale. Pixels representing occluded areas 420 (concealed object) are indicated with pixel values towards the dark range of the gray scale. The pixel value contrast between occluded and non-occluded areas is indicative of the presence of a concealed object 420 which blocks or otherwise attenuates the natural energy emission or reflection of the human body 410. This pixel value contrast can be presented in visual form 400 or as numerical data to a computer algorithm (concealed object detection module 346 described herein) for subsequent automated analysis, or both.

Figure 5:
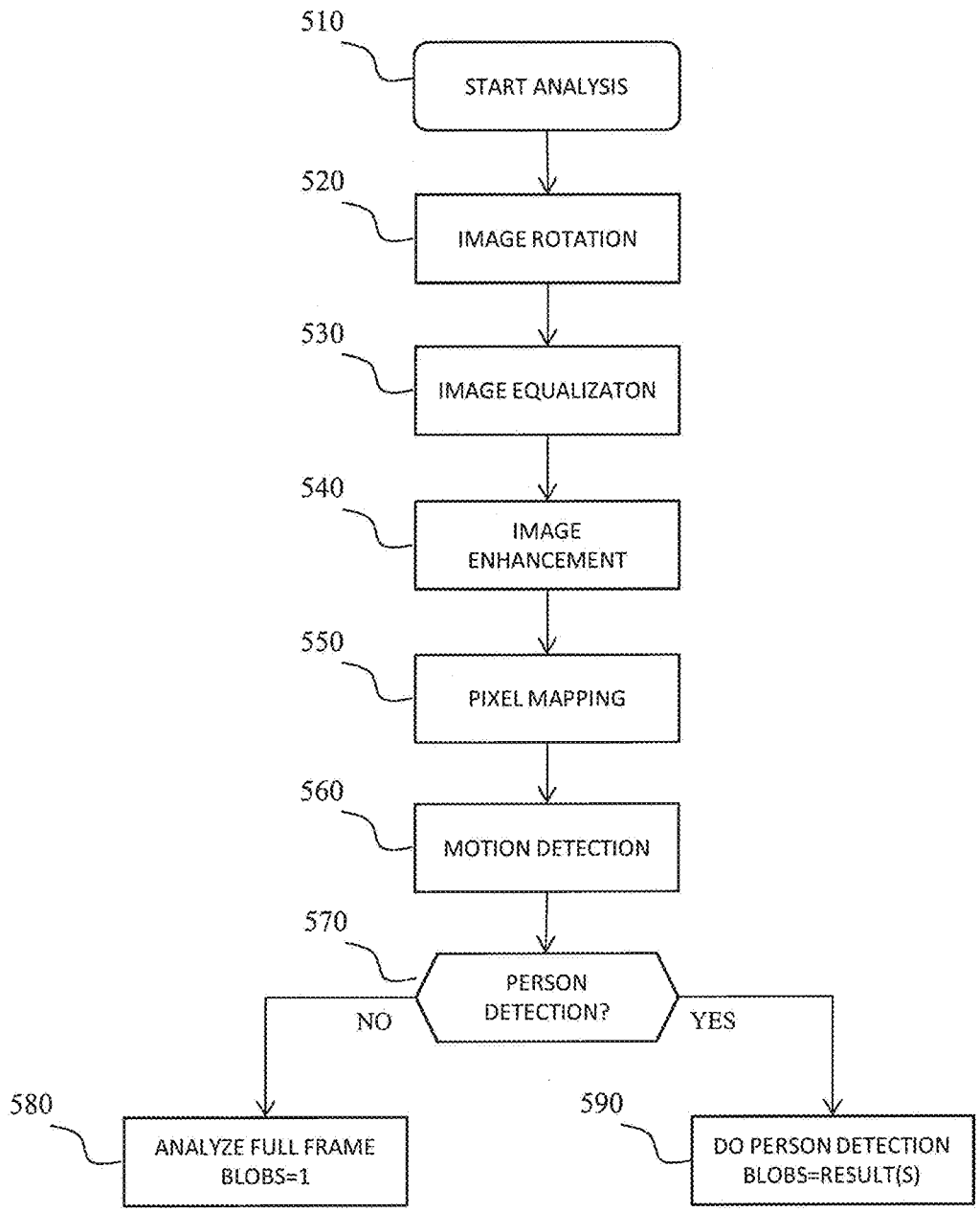
FIG. 5 depicts a flow diagram of the initial software steps used for threat detection in a particular embodiment of the inventive system.

Referring now to FIG. 5, an illustration of a flow diagram is provided showing the initial steps for image analysis 500 in the preferred embodiment of the presently disclosed system. At the start of the analysis 510, various algorithmic initializations are made.

Step 520 provides for optional image rotation, minimally at 90 degree increments providing for flexible camera mounting options (e.g., mounting a camera upside down) as well as allowing for portrait orientation mounting conforming the imager to the vertical (tall) nature of a standing human. Image rotation algorithms are well understood and practiced and obtainable as can be appreciated by those of ordinary skill in the art.

Step 530 provides for image equalization or "data stabilization", referencing a current image to a previously selected or learned image. This can be achieved via video subtraction or learning one or more brightness (temperature) levels in a reference image and algorithmically adjusting the current image to obtain the same values. For instance, if a learned area in a reference scene has an average pixel value of 32 and the current image has an average pixel value in the same area of 40, then all pixels in the current image should be lowered by 40−32=8 to achieve similar results. While the foregoing example is intentionally simplistic, more effective and sophisticated algorithms are possible, either written custom or known to those of ordinary skill in the art such as auto-brightness algorithms.

Step 540 provides for optional image enhancement algorithms including one or more of the many image enhancement algorithms known by those of ordinary skill in the art including, but not limited to, edge sharpening, image smoothing, contrast enhancement and contrast stretching.

Step 550 provides for optional mapping of individual pixels for some characteristic such as a motion pixel, a masked-off region pixel, a dead pixel, etc. In a particular embodiment, the mapping is implemented via a separate image plane with 1:1 mapping for the image pixels.

Step 560 provides for motion detection which can be implemented via video subtraction or any of the more sophisticated algorithms as can be appreciated by those of ordinary skill in the art.

Step 570 provides for optional person detection, allowing either full frame image analysis 580 if person detection is off, or person-borne detection if person detection is on. The actual person detection algorithm 590 can vary from any of the known techniques or be custom in nature. The result of the algorithm in a particular embodiment takes the form of a list of blobs including, but not limited to, information describing the bounding rectangle, aspect ratio, confidence level, location and velocity vector.

Figure 6:
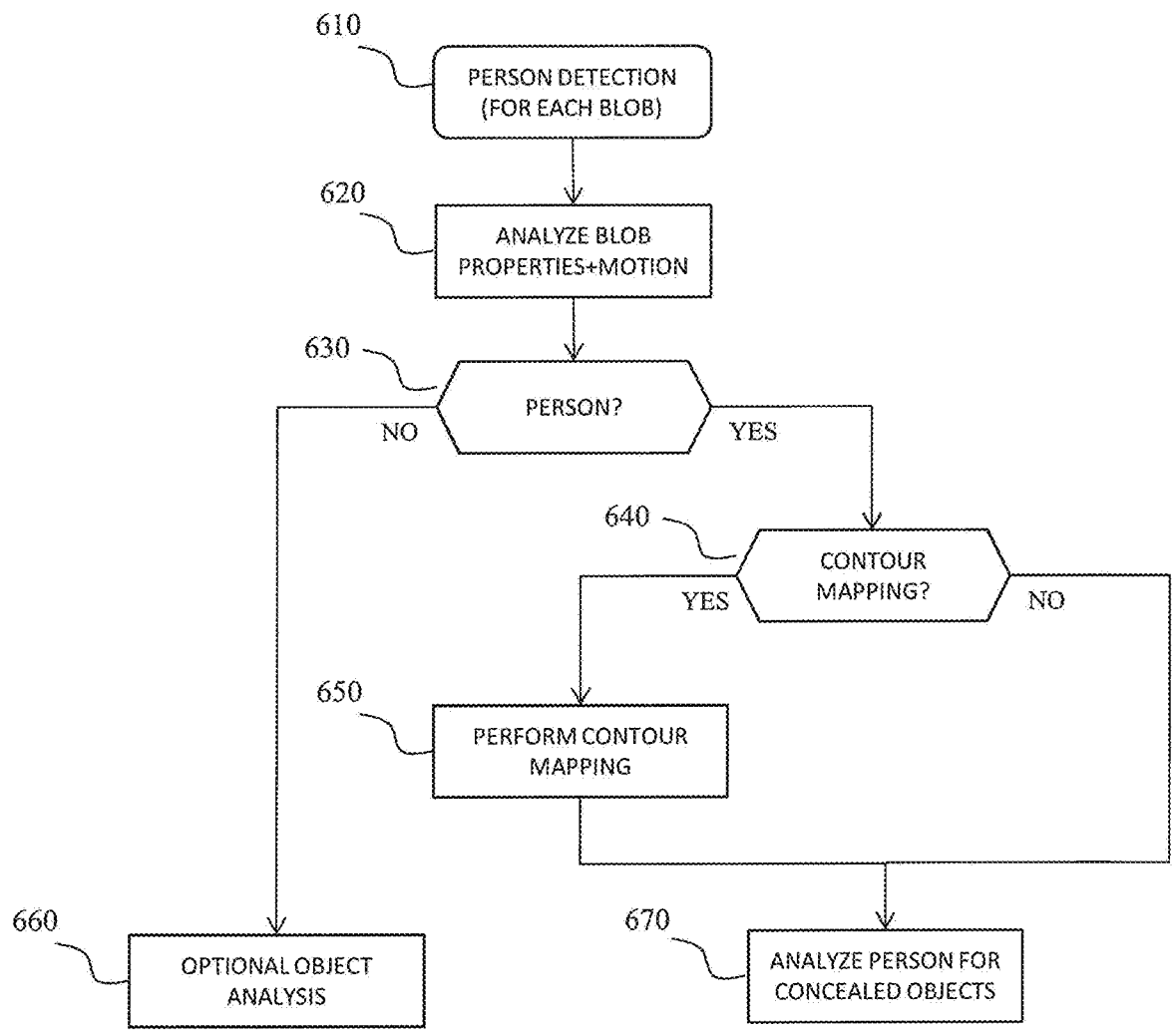
FIG. 6 is a flow diagram of additional software steps used for threat detection in a particular embodiment.

Referring now to FIG. 6, a flow diagram 600 of additional algorithmic processing steps is presented which describes added steps for processing an image towards the goal of detecting concealed objects.

For example, Step 610 provides for the processing of each prospective blob which represents an area of the image in which a person is potentially displayed.

Step 620 provides for the algorithmic analysis of the currently considered blob for the properties of motion (versus one or more previous images) as well as visual attributes indicative of the presence of a person. Such attributes may include, but not be limited to, size, shape, presence of body-range temperatures, presence of skin-range temperatures, gait, facial recognition, vertical symmetry about the centerline (e.g., symmetrical head, torso, presence of left and right arms, presence of left and right legs).

Step 630 evaluates the output of the person detection analysis step 620 and preempts further person-related analysis or continues with the person-related analysis.

Step 660 provides for object analysis in the case that the person detection decision 630 is negative. Possible object analysis can include, but not be limited to, object left behind, animal, nuisance alarm such as reflected light, and so on.

Step 640 provides for optional contour mapping if enabled.

Step 650 represents the optional contour mapping algorithm which can algorithmically enhance the area of pixels in which a person has been detected by digitally removing shadows or carried items, eliminate undesirable background pixels such as those showing between the legs or between the arms and the torso and other non-person image artifacts. The artifacts can be removed either using transparent-labeled pixels (either a cold, mild or hot pixel value) or by marking the artifact pixels in the pixel map 550 previously described.

Figure 7:
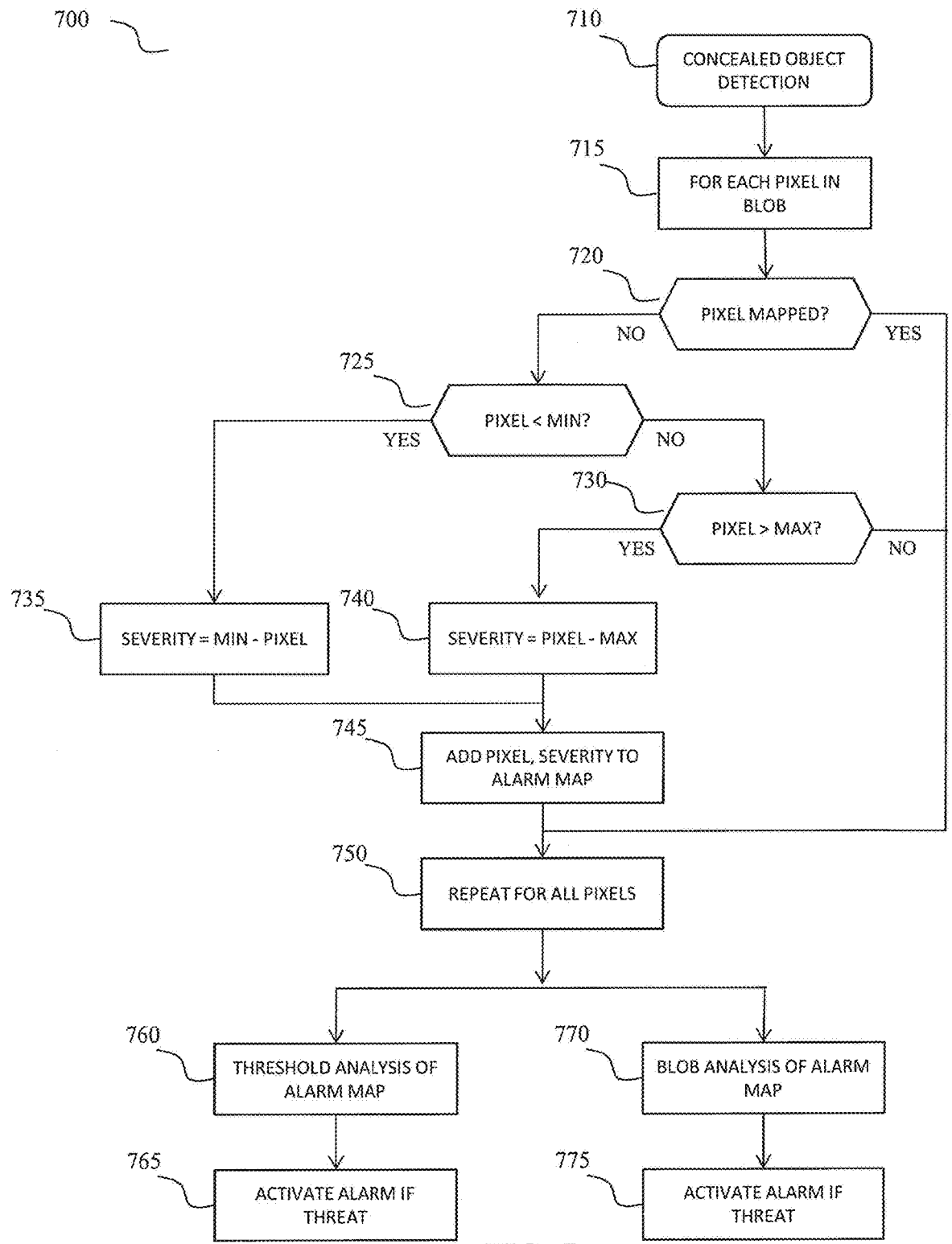
FIG. 7 is a flow diagram of yet more additional software steps used for threat detection in a particular embodiment.

Step 670 then leads to the analysis of the identified person, appropriately contour mapped if desired, per FIG. 7.

Referring now to FIG. 7, a flow diagram 700 of the algorithm for concealed object detection is presented for a particular embodiment of the presently described system.

The concealed object detection algorithm begins with the output of the person detection module 600 and initializes the prerequisite variables at step 710

Step 715 considers each pixel in turn, preferably pixels matching the contour of the person detected and not just any pixel within the person's (blob's) bounding box.

Step 720 determines if the pixel address is represented in the pixel map. If so, pixels representing non-motion, pixels representing skin, pixels representing locations outside of the contour of the person can be disqualified from further analysis.

Step 725 compares the pixel value to the lowest allowable threshold value representing normally expected body temperature. This is established at time of system setup and requires operator input and contrasts to other techniques such as comparison to a known threat value, a database of threat values or other means.

Step 730 compares the pixel value of pixels greater than or equal to the allowable minimum threshold value now to the upper allowable threshold value representing normally expected body temperature. If a pixel survives steps 725 and 730 and is determined to be within the expected values of normally expected body temperature as selected by the operator at the time of system setup, it is exempt from further processing and execution of the algorithm proceeds to step 750.

Step 735 and step 740 calculate the difference between the current pixel and the closest allowable body temperature range and can be considered an indication of the severity of the difference in levels, with smaller differences indicating pixels closer to normal body temperature and less egregious.

Step 745 then adds the pixel difference or severity indication to an alarm map which can be a simple bad pixel count or a more sophisticated alarm map implemented via a separate image plane or some other mechanism.

Step 750 repeats the pixel processing steps for all pixels within the person's designated blob bounding box.

Steps 760 and 765 may be implemented for simplistic alarm indication, using a bad-pixel count versus threshold value or similar technique.

Steps 770 and 775 may be implemented to offer a more sophisticated alarm indication, using an additional pass through the blob detection algorithm 620 to group and categorize alarmed pixels in terms of severity, location, proximity to established locations on the body for concealed objects or some other technique. The more sophisticated processing offered by step 770 leads to reduced false alarms and increased probability of detection before activating the threat alarm 775.

Referring now to FIG. 8, several examples of concealed threat detection algorithms are disclosed, implemented in C #. For example, algorithm 810 discloses a method of counting the instances of image pixels outlying an acceptable gray scale range. A count exceeding a threshold setting causes the objectDetected flag to be set.

Algorithm 820 discloses a method of summing the gray scale magnitudes of pixels outlying an acceptable gray scale range. A sum exceeding a threshold setting causes the objectDetected flag to be set.

Algorithm 830 discloses a method of counting the instances of image pixels outlying an acceptable gradient limit. A count exceeding a threshold setting causes the objectDetected flag to be set.

Figure 9:
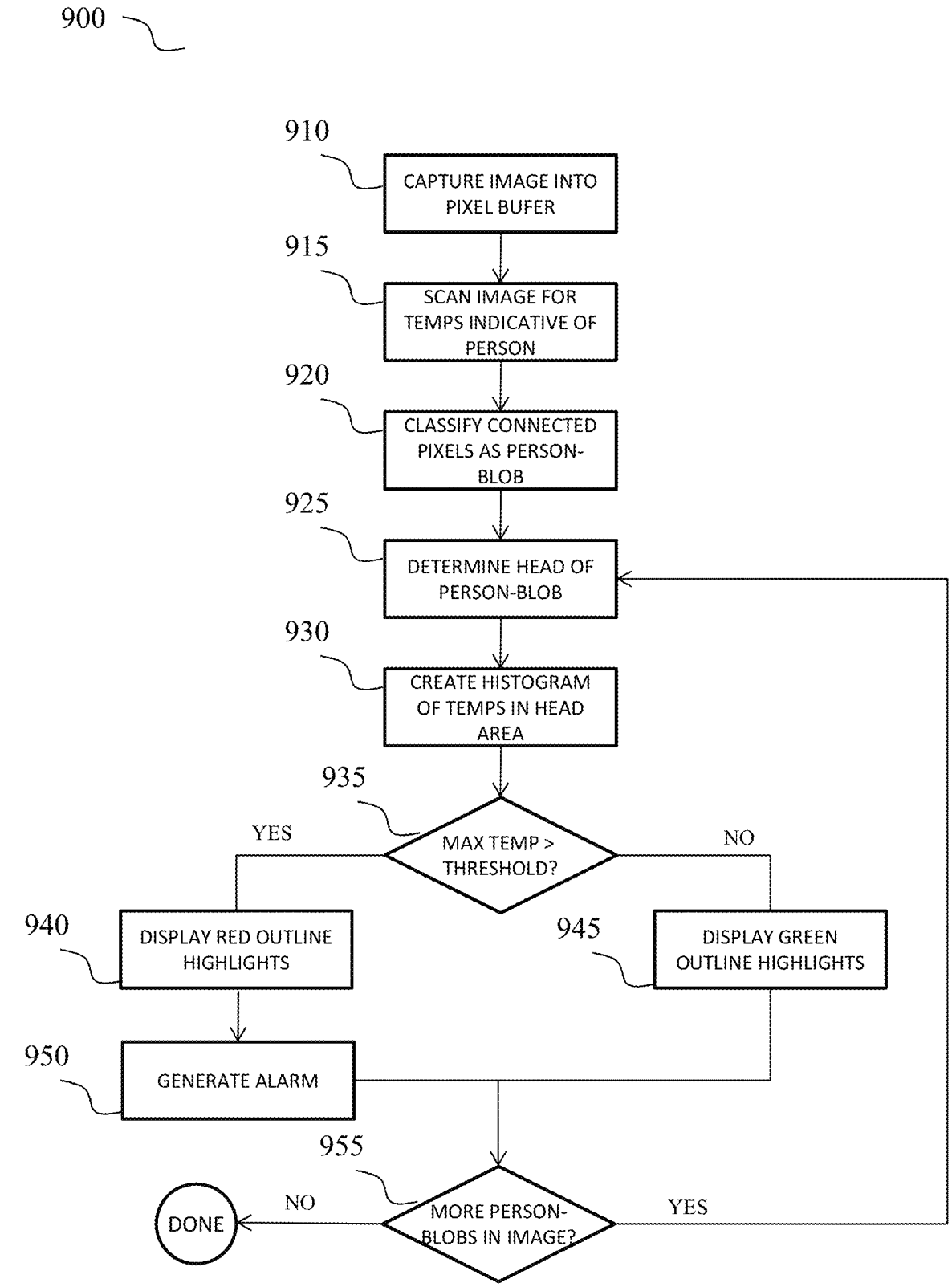
FIG. 9 is a flow diagram of a method for detection of elevated body temperatures using an infrared imager.

Referring to FIG. 9, an algorithmic flow diagram for detection of elevated body temperatures using an infrared imager is disclosed and generally designated 900.

The disclosed system and method leverages the existing infrared sensor described above that is used for detection of concealed objects underneath clothing to additionally detect elevated body temperatures of exposed skin, notably in the face. Elevated facial temperatures have been shown to be indicative of stress in an individual in the commission or anticipation of a crime such as, but not limited to, theft, smuggling or harm to one or more individuals.

At step 910, infrared sensor image data is captured from an infrared sensor. The infrared sensor data reflects the temperature values of the individual pixels comprising the image. The infrared sensor data is stored in a rectangular pixel buffer where the x axis represents pixels comprising the width of an image while the y axis represents pixels comprising the height of an image.

At step 915 the infrared image acquired in step 910 is scanned for pixels reflecting a temperature value indicative of the presence of a person. Pixels colder or hotter than a predetermined human-temperature range are ignored for the purpose of this algorithm and considered background pixels. Pixels within a predetermined human-temperature range are considered to represent one or more human subjects within the field of view.

Step 920 uses connected component analysis or similar techniques to classify the human-temperature range pixels as one or more human subjects within the field of view, or as non-human artifacts also occupying the human-temperature range, such as an inanimate heat source or animal within the field of view. The resultant output (s) of step 920 are one or more blobs of connected pixels per conventional blob analysis techniques.

Step 925 performs analysis of a person blob for the location and boundaries of the head. Analysis can be performed as a Hough Transform Shape Detection, pixel-wise width measurement relative to a comparative shoulder measurement, or some other technique. Results of the head analysis are compared to allowable width, height and aspect ratio tolerances which are ideally relative to the width and height of the total person blob, allowing for more accurate detection independent of the size of the person in the image which changes with the distance of the person from the infrared imager of step 910.

A histogram of the temperature pixels contained within the head area identified in step 925 is computed in step 930. A user-selectable comparison mode comprising of a) maximum single value, b) average of maximum 2%, c) average of maximum 5% of histogram values, or d) some other approach is used to compare the head area pixels to a pre-determined threshold value in step 935.

If the comparison of step 935 determines the temperature result of the head area exceeds the pre-determined threshold value, step 940 will display a red outline of the head area indicating to the operator of an excessive temperature condition. Step 950 will then activate any alarm mechanism that may be present, such as, but not limited to, an annunciator, an alarm bell, an output signal or any combination thereof.

If the comparison of step 935 determines the temperature result of the head area does not exceed the pre-determined threshold value, step 945 will display a green outline of the head area indicating to the operator of an acceptable temperature condition.

Step 955 provides a looping mechanism to allow the processing of additional subjects that may be within the scene. This allows comprehensive elevated temperature detection of as many people in the scene as have been identified by step 920.

Figure 10:
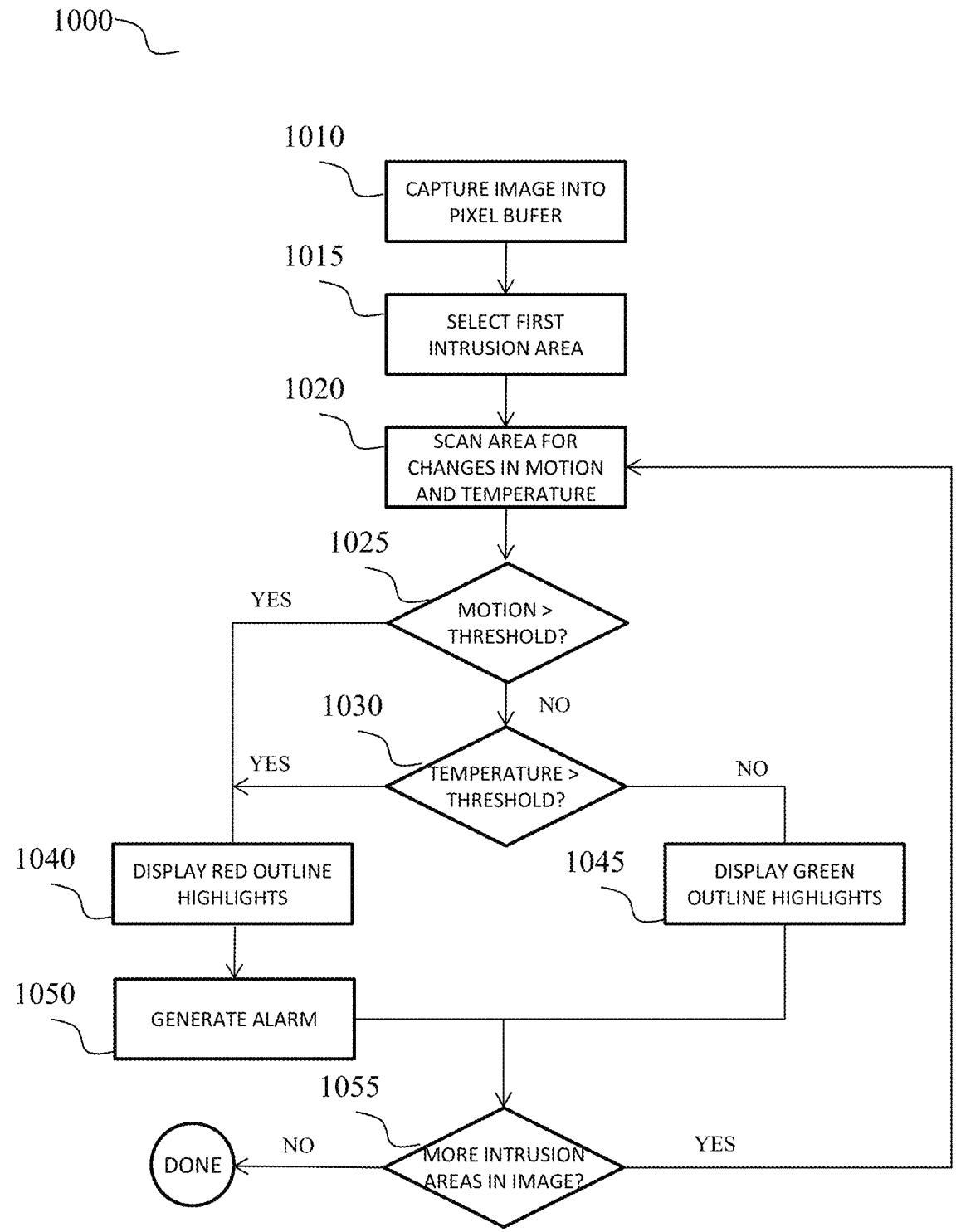
FIG. 10 is a flow diagram of a method for detection of intrusion into a monitored zone using an infrared imager.

Referring to FIG. 10, a particular illustrative flow diagram of a method for detection of intrusion into a monitored zone using an infrared sensor and/or visible spectrum sensor is disclosed and generally designated 1000.

The disclosed system and method similarly leverages the existing infrared and/or visible spectrum sensors described above that are used for detection of concealed objects underneath clothing to additionally detect intrusions (incursions) into a monitored zone within the same image. Intrusions may be considered incursions into areas that should be devoid of movement and/or temperature indicative of people, such as, but not limited to, restricted areas near utility closets, offices, elevators, entrances, or exits. Performing the intrusion detection function using the existing infrared and/or visible sensors used for concealed threat detection provides a cost savings to the end-user and simplifies the realization of the detection system through elimination of additional sensors, cables, brackets, processing and display equipment, training, spare parts and the like.

At step 1010, infrared and/or visible spectrum sensor image data is captured from a sensor. For infrared sensors, the sensor data reflects the temperature values of the individual pixels comprising the image. For visible spectrum sensors, the sensor data reflects the gray scale or color pixel values of the individual pixels comprising the image. The sensor data is stored in one or more rectangular pixel buffers where the x axis represents pixels comprising the width of an image while the y axis represents pixels comprising the height of an image.

At step 1015 a portion of the one or more images acquired in step 1010 is scanned. The portion of the image is compared to a previously captured "learned" or "reference" image used as a baseline image. Differences in pixel values between the pixel buffer for the current image and the reference image are calculated, whether for infrared data, gray scale data, color data or a combination thereof. Step 1015 precedes a loop allowing for additionally pre-defined intrusion areas within the same image to be analyzed by the algorithm.

Step 1020 performs the comparison of the currently evaluated intrusion zone with the corresponding area of the reference image. Comparison in the preferred embodiment of the invention involves the sum of the absolute value of the differences between the currently evaluated intrusion zone pixels with their corresponding reference zone pixels.

$$MAE = \frac{1}{n}\sum |y - \hat{y}|$$

Another aspect of the invention involves the sum of squares of the differences between the currently evaluated intrusion zone pixels with their corresponding reference zone pixels.

$$\sum_{i=1}^{n}(x_i - \bar{x})^2 = \left[\sum_{i=1}^{n}x_i^2\right] - \frac{1}{n}\left[\sum_{i=1}^{n}x_i\right]^2$$

Step 1025 compares the result of the motion detection to a pre-determined threshold value. Results greater than the pre-determined threshold value are indicative of motion within the currently evaluated intrusion zone which is undesirable. Since the comparison algorithm of step 1020 computes differences between current and reference pixel values, it performs sufficiently for images generated by infrared, gray scale or color based sensors. Step 1025 may include provisions for a weighted comparison according to the area of the intrusion zone so that a single pre-determined threshold value functions similarly for small sized and larger sized intrusion zones.

Step 1030 compares the result of the temperature detection to a pre-determined threshold value. Results greater than the pre-determined threshold value are indicative of the presence of a person within the currently evaluated intrusion zone, which is undesirable. Since the temperature comparison algorithm of step 1020 computes the differences between current and reference pixel-based temperature readings, it is suitable only for images generated by infrared based sensors which uniquely present temperature data.

If the comparison of step 1025 or step 1030 exceeds their respective pre-determined thresholds, determining that an intrusion is present, step 1035 will display a red outline of the intrusion or intrusion area indicating to the operator of an intrusion condition. Step 1050 will then activate any alarm mechanism that may be present, such as, but not limited to, an annunciator, an alarm bell, an output signal or any combination thereof.

If the comparison of steps 1025 and steps 1030 both determine that an intrusion is not present, step 1045 will display a green outline of the intrusion area indicating to the operator of an acceptable condition.

Step 1055 provides a looping mechanism to allow the processing of additional intrusion zones that may be within the scene. This allows comprehensive intrusion detection of as many zones in the scene as have been identified by step 1020.

Figure 11:
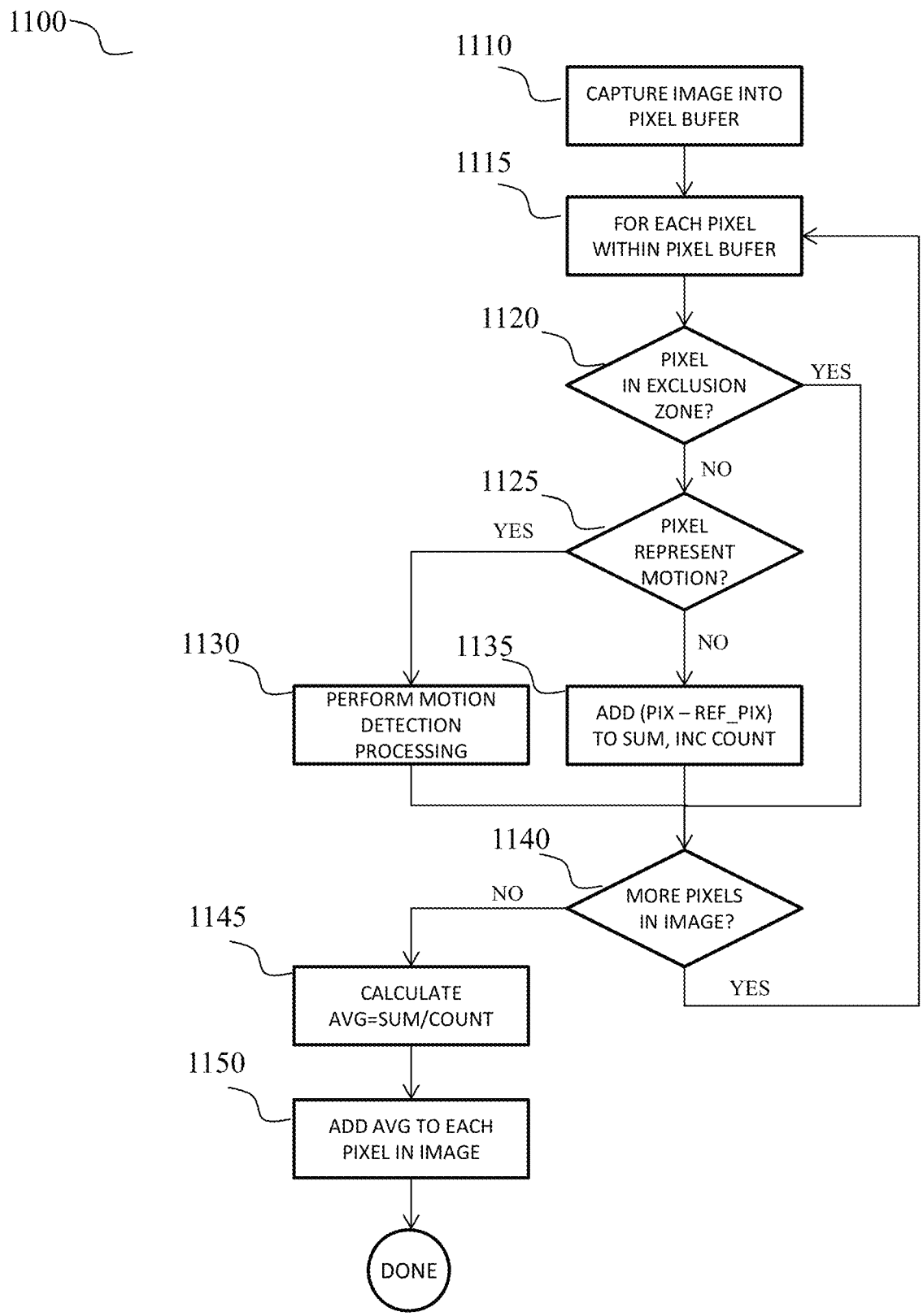
FIG. 11 is a flow diagram of a particular embodiment of a method for providing automatic brightness level stability adjustment within an image.

Referring to FIG. 11, a particular illustrative flow diagram of a method for providing automatic brightness level stability within an image is disclosed. The disclosed system and method is applicable to infrared, gray scale and color sensors.

At step 1110, infrared and/or visible spectrum sensor image data is captured from a sensor. For infrared sensors, the sensor data reflects the temperature values of the individual pixels comprising the image. For visible spectrum sensors, the sensor data reflects the gray scale or color pixel values of the individual pixels comprising the image. The sensor data is stored in one or more rectangular pixel buffers where the x axis represents pixels comprising the width of an image while the y axis represents pixels comprising the height of an image.

Step 1115 represents the start of a loop allowing each pixel in the image buffer to be evaluated by the algorithm.

Step 1120 determines if the pixel location is contained within one or more exclusion zones determined by the operator. These exclusion zones represent areas where the automatic brightness level stability algorithm should not operate, such as, but not limited to, reflective areas of water, high movement areas such as traffic lanes or trees and similar areas of the image. The exclusion zones may be specified by the operator using an overlay map, discrete areas defined by rectangles or other shapes, learned areas of high movement and mapped into a separate buffer, or other means. Pixel locations that do correspond to an exclusion zone cause execution to proceed to step 1140. Pixels locations that do not correspond to an exclusion zone cause execution of the algorithm to continue to step 1125.

Step 1125 compares the currently evaluated pixel to a reference image for motion. In the preferred embodiment of the presently described invention, motion is determined by subtracting the currently evaluated pixel from the corresponding pixel in the reference image and comparing the absolute value of the difference to a motion threshold. In another embodiment, motion is determined by comparing the square of the difference between the currently evaluated pixel and the corresponding reference pixel to a motion threshold. The reference image can be acquired using a learn mode or by saving an image during a period of little or no detected motion.

If the currently evaluated pixel is determined by step 1125 to represent motion by exceeding the pre-determined motion threshold value, the algorithm continues to step 1130, otherwise the algorithm continues to step 1135.

Step 1130 illustrates how the determination of motion can be leveraged to perform ancillary motion detection calculations not germane to the currently described algorithm. In this fashion the image captured and stored in the pixel buffer at step 1110 does not have to be re-scanned from the beginning to detect motion pixels. Instead, they are revealed by the currently described algorithm and can be leveraged directly for improved system performance.

At step 1135 the motion calculation value calculated in step 1125, namely the difference between the currently evaluated pixel and the corresponding reference pixel, is added to a summation of all differences across the entire image. This accumulation of differences leverages the signed result of the difference calculation. A count value is incremented allowing for an average difference calculation in a subsequent step.

Step 1140 continues the loop back to step 1115 until all pixels in the image have been evaluated.

Step 1145 calculates the average difference for evaluated pixels by dividing the accumulated sum by the count of evaluated pixels. A signed division is employed to allow for positive and negative average results. A divide-by-zero check is performed before the division to insure correct operation. The resultant average difference represents the value that should be later added to all pixels in the image so that the resultant image approximates the reference image.

Step 1150 performs the addition of the resultant average difference to all pixels within the image, thus achieving an approximation of the brightness levels of the reference image. The currently described algorithm is suitable for infrared and gray level images directly. For color images, the same algorithm is applied to the intensity component of the image, such as the Y component in a YUV image. Color images using other color space schemes, like RGB, must first be converted to YUV before applying the algorithm.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of That which is claimed is:

1. A method of using a thermal imager, the method comprising:
    obtaining an output comprising a plurality of pixels representing a person;
    analyzing each pixel matching a contour of the person and included within a blob bounding box of the person;
    determining whether a pixel address is represented in a pixel map;
    excluding pixels representing non-motion, skin, and locations outside of the contour of the person;
    comparing a value of each remaining pixel to an allowable minimum threshold value representing a lower pre-defined body temperature;
    comparing the value of each remaining pixel greater than or equal to the allowable minimum threshold value to an upper allowable threshold value representing an upper pre-defined body temperature;
    excluding any of the remaining pixels within a range between the lower and upper pre-defined body temperatures to define a final set of pixels;
    calculating a pixel difference between the value of each pixel of the final set of pixels and a respective closest pixel within the range between the lower and upper pre-defined body temperatures to indicate a severity of the difference; and
    adding the calculated pixel difference to an alarm map of outlying pixels which are outside a range of pixel values (pixelValue<minGray and pixelValue>maxGray) of the final set of pixels.

2. The method of claim 1, further comprising calculating a pixel difference for all pixels within the blob bounding box of the person.

3. The method of claim 1, further comprising issuing an alarm indication when the pixel count of outlying pixels which are outside the range of pixel values (pixelValue<minGray and pixelValue>maxGray) exceeds a threshold pixel count value.

4. The method of claim 1, further comprising using a blob detection algorithm to group and categorize alarmed pixels in terms of severity, location, proximity to established locations on the person for concealed objects.

5. The method of claim 1, wherein the calculated pixel difference indicates a contrast of a respective value of each pixel of the final set of pixels to the lower and upper pre-defined body temperatures.

6. The method of claim 1, further comprising detecting a concealed object by an algorithm that counts the number of pixels of the final pixel set outlying the range and when the pixel count of outlying pixels which are outside the range of pixel values (pixelValue<minGray and pixelValue>maxGray) exceeds a threshold, an objectDetected flag is set.

7. The method of claim 1, further comprising detecting a concealed object by an algorithm that sums a magnitude of each pixel outlying the range and when the sum exceeds a threshold, an objectDetected flag is set.

8. The method of claim 1, further comprising detecting a concealed object by an algorithm that counts a number of pixels of the final pixel set outlying an acceptable gradient limit and when the count exceeds a threshold, an objectDetected flag is set.

9. The method of claim 1, wherein a contour mapping algorithm is configured to enhance an area of pixels in which the person has been detected by digitally removing at least one of shadows, carried items, undesirable background pixels showing between legs or between arms and a torso, and other non-person image artifacts using transparent-labeled pixels.

10. The method of claim 1, wherein a blob algorithm analyzes a detected blob for properties of motion and visual attributes to determine a presence of a person.

11. The method of claim 10, wherein the visual attributes include at least one of size, shape, presence of body-range temperatures, presence of skin-range temperatures, gait, facial recognition, and vertical symmetry about a centerline.

12. A system to detect concealed objects using a thermal imager comprising:
    a processor having a memory;
    an infrared sensor; and
    a visible spectrum camera coupled to the processor;
    wherein the processor is configured to
        obtain an output comprising a plurality of pixels;
        analyze each pixel matching a contour of a person and included within a blob bounding box of the person;
        determine whether a pixel address is represented in a pixel map;
        exclude pixels representing non-motion, skin, and locations outside of the contour of the person;
        compare a value of each remaining pixel to an allowable minimum threshold value representing a lower pre-defined body temperature;
        compare the value of each remaining pixel greater than or equal to the allowable minimum threshold value to an upper allowable threshold value representing an upper pre-defined body temperature;
        exclude any of the remaining pixels within a range between the lower and upper pre-defined body temperatures to define final set of pixels;
        calculate a pixel difference between the value of each pixel of the final set of pixels and a respective closest pixel within the range between the lower and upper pre-defined body temperatures to indicate a severity of the difference; and
        add the calculated pixel difference to an alarm map using a pixel count of outlying pixels which are outside a range of pixel values (pixelValue<minGray and pixelValue>maxGray) of the final set of pixels.

13. The system of claim 12, wherein the infrared sensor comprises at least one of a long wave infrared sensor, a mid-wave infrared sensor, and a short wave infrared sensor.

* * * * *